United States Patent [19]

Ward

[11] Patent Number: 4,493,589

[45] Date of Patent: * Jan. 15, 1985

[54] INTERNAL PIPELINE PLUG FOR DEEP SUBSEA OPERATIONS

[75] Inventor: John M. Ward, Katy, Tex.

[73] Assignee: Shell Oil Company, Houston, Tex.

[ * ] Notice: The portion of the term of this patent subsequent to Nov. 23, 1999 has been disclaimed.

[21] Appl. No.: 463,212

[22] Filed: Feb. 2, 1983

Related U.S. Application Data

[62] Division of Ser. No. 278,937, Jun. 30, 1981, Pat. No. 4,390,043.

[51] Int. Cl.$^3$ .............................................. F16L 1/04
[52] U.S. Cl. ..................................... 405/166; 405/171
[58] Field of Search ............... 405/158, 166, 168, 169, 405/170, 171; 138/89

[56] References Cited

U.S. PATENT DOCUMENTS 3,136,133 6/1964 Perret .............................. 405/171 X
3,931,670 1/1976 Arnold ........................... 405/170 X
4,360,290 11/1982 Ward .................................. 405/170

Primary Examiner—David H. Corbin

[57] ABSTRACT

Pressure-tight pipeline plugs are used in subsea connection operations to achieve a lightweight pipe condition which facilitates alignment by easing handling problems. An internal plug is provided for this purpose which is particularly useful for connection operations using a pipelay vessel, and which is capable of sealing, remotely releasing and then being pumped out of the line to a terminus.

2 Claims, 6 Drawing Figures

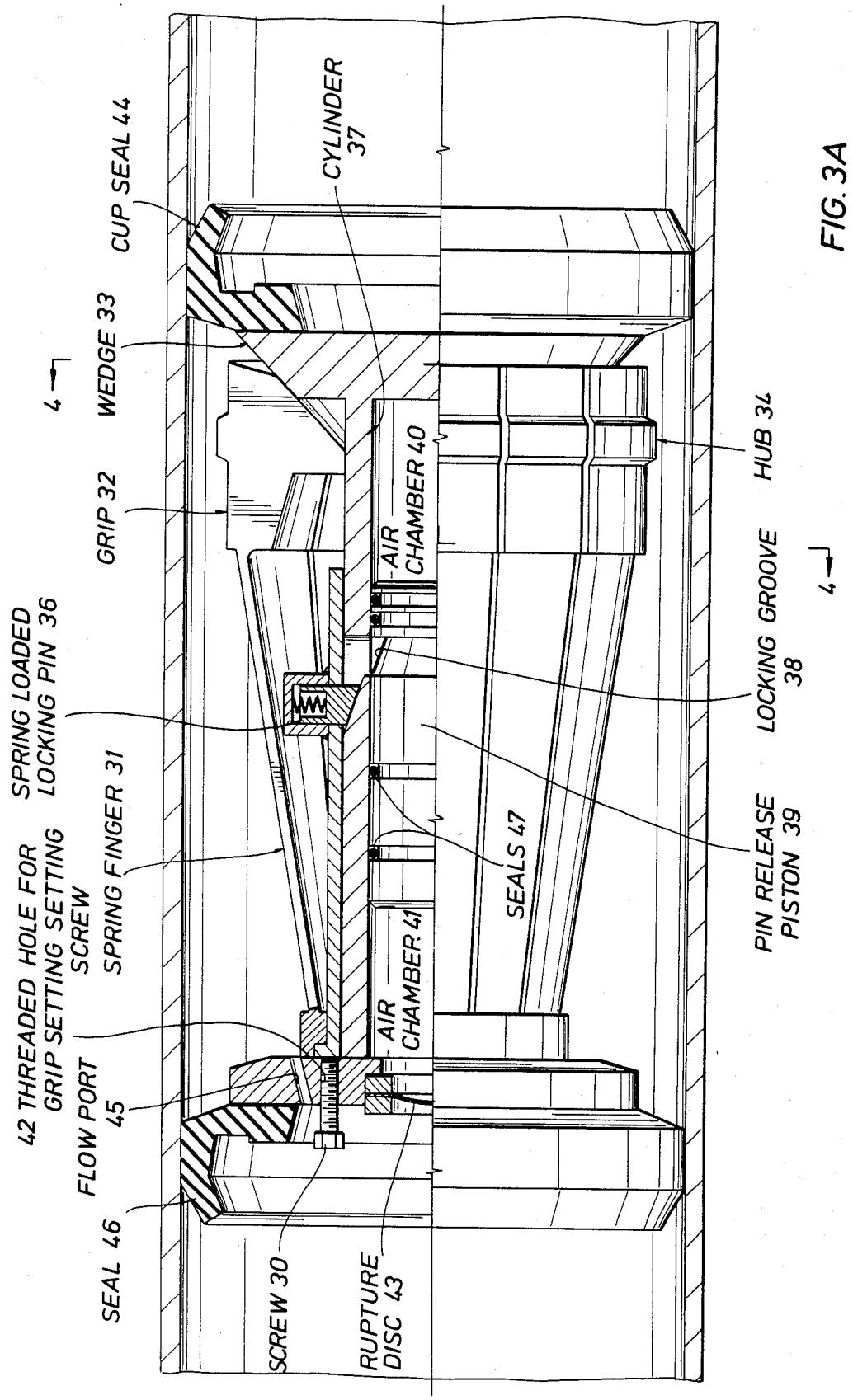

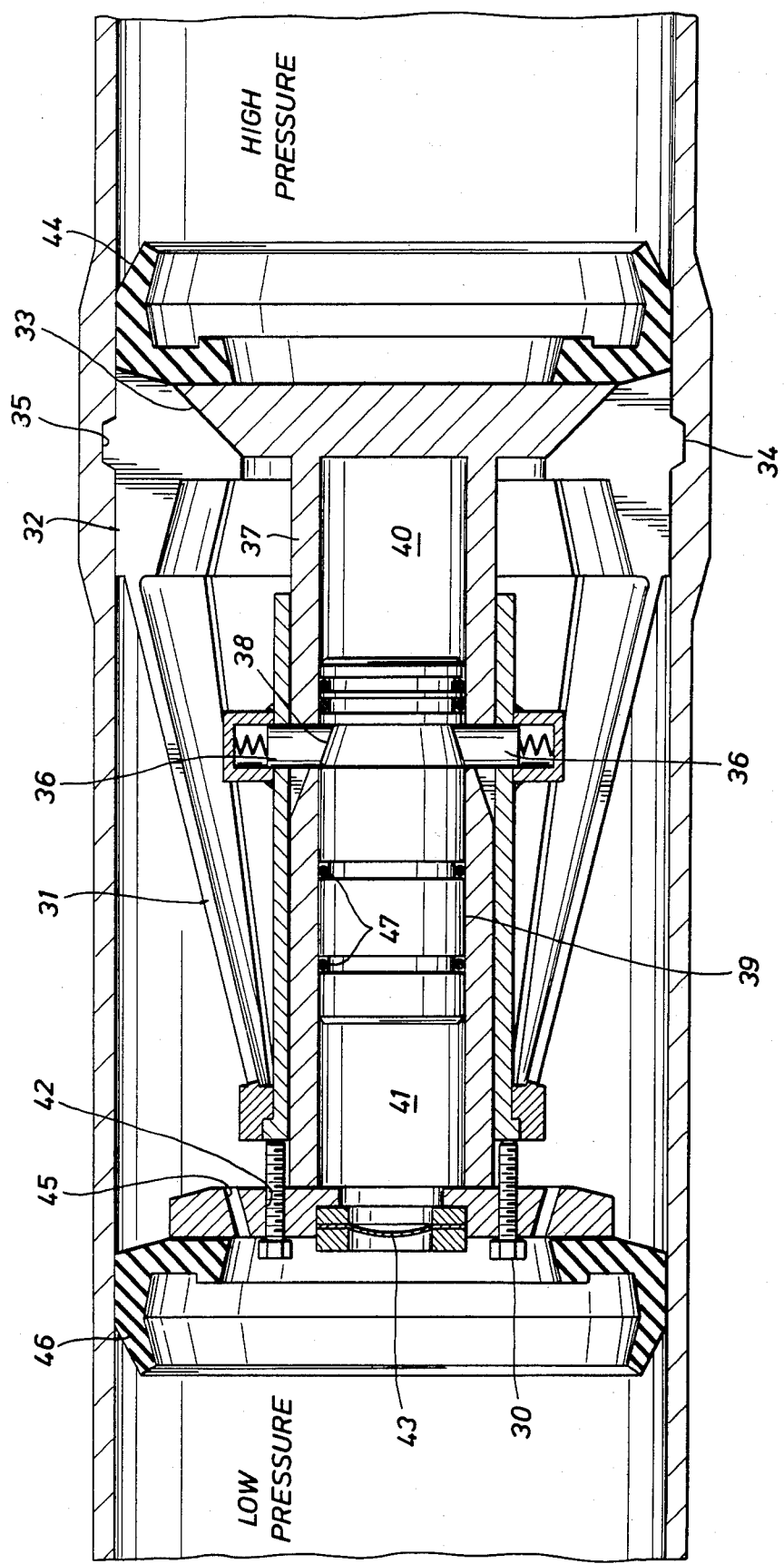

INTERNAL PIPELINE PLUG FOR DEEP SUBSEA OPERATIONS

This is a division of application Ser. No. 278,937, filed June 30, 1981, now U.S. Pat. No. 4,390,043.

BACKGROUND OF THE INVENTION

In conventional offshore pipelay operations, plugs are welded onto the pipeline end when the end must be laid on bottom. This can be done as a planned or emergency measure, permitting the pipeline to remain dry and light for subsequent recovery of the pipeline end. The welded plug both seals the pipe end to keep out water and provides the means for transferring tension to the pipe during abandonment and recovery. After recovery the welded plug may simply be cut off.

For deepwater pipeline construction operations where subsea connections are required, there is a need for different kinds of plugs. Like welded plugs, such plugs must keep out water to lighten the pipe and ease alignment operations, but the plugs are not necessarily used for pulling, since there may be additional alignment structure at the pipe end which can serve as a pull point. The major difference is that once alignment of pipe connectors is achieved, the plugs must be removed on bottom in conjunction with the connection operations rather than being brought to the surface for removal.

Somehow the hydrostatic pressure across the plugs must be equalized, and the plugs safely released just before or after the connectors are joined. It is preferable to perform the plug release and removal operation remotely, that is, without divers, since diving operations in deep water become prohibitive both technically and economically.

From the foregoing, it is clear that welded plugs would be difficult to use in deep subsea connection. Even if the welded plug could be removed on bottom (perhaps explosively), there is then a need in the art for a suitable pipe end configuration for subsequent connection operations.

SUMMARY OF THE INVENTION

Purposes of the present invention include (a) the provision of basic applications of internal pipeline plugs for deep subsea connection operations, (b) the ascertainment of the elements of an internal pipeline plug required for such applications, (c) the defining of general operational requirements in applying internal plugs in basic applications, and (d) the inclusion of steps for inserting plugs during deepwater operations and removing the plugs once the pipe has been laid, and doing so remotely, without divers. The applications of internal plugs of the present invention include assembly of pipe strings on bottom and initiation and termination of pipe lines laid from surface vessels. The plugs can be used at mid-points within a pipe string as well as at submerged pipe ends.

The main distinguishing features of the plug of the present invention is that the plug can be pumped through the pipeline, including large radius elbows. The release mechanism of the plug is entirely mechanical (no batteries, solenoids gas bottles, etc.) and is actuated simply by pressuring the pipe. The present invention pertains specifically to an internal pipe plug which is contained entirely within the inside diameter of the pipe. No part projects over the pipe end. The plug can be removed from either pipe end if the line has a constant diameter.

Thus, the invention provides an internal plug capable of sealing, releasing and being pumped out of a pipeline including means for sealing a high pressure side of the plug from a low pressure side, means for gripping the pipe wall, pressure release means operable at a set pressure to permit fluid passage into the plug, and means operable to release the gripping means from the pipe wall. Preferably the pressure release means is a rupture means breakable at a set pressure to permit fluid passage.

Further, the invention covers a method for laying a pipeline in an at least near neutral buoyancy condition comprising sealing a gas into at least part of a pipe string between a pipelay vessel at one end of the pipe string and a pressure releasable plug within the pipe string, connecting the pipe string to another pipe end, flooding the pipe string and releasing the plug with fluid pressure and passing the plug out of the pipe string.

DESCRIPTION OF THE DRAWINGS

FIGS. 3(A), 3(B) and 3(C) show the plug in its three operative positions.

DISCUSSION OF THE PRIOR ART

Figure 1:
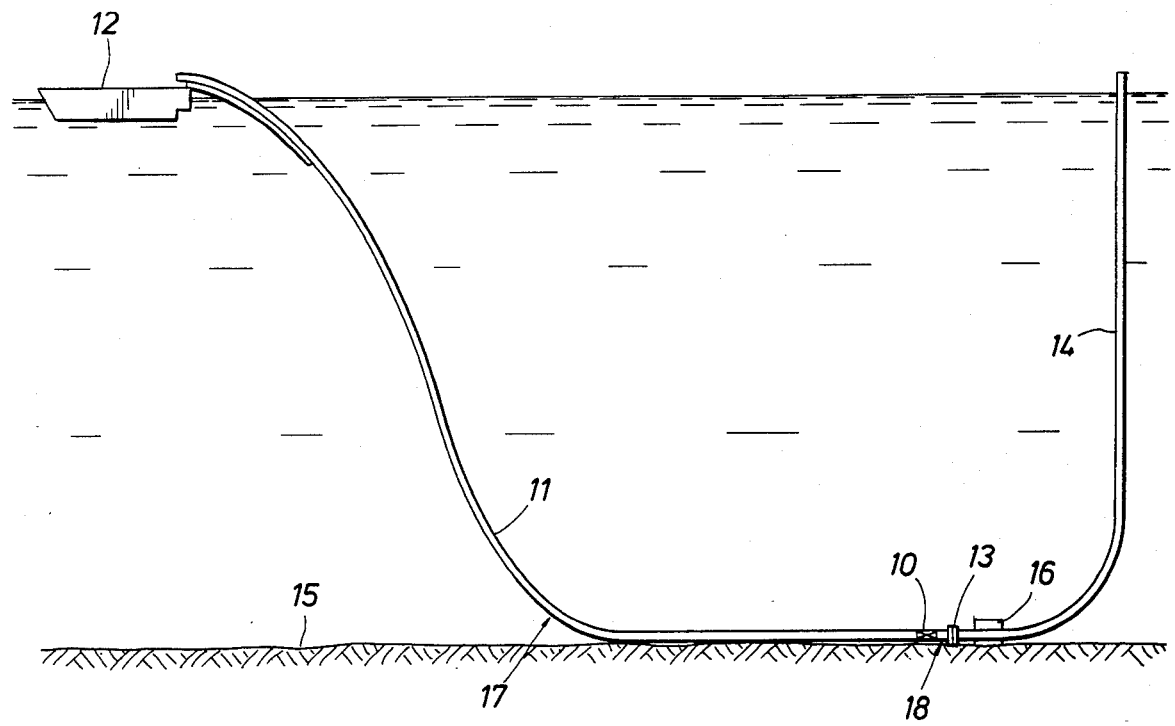
FIG. 1 shows the pipelay connection technique of the invention.

Duncan (U.S. Pat. No. 3,978,678) and LeCordier (U.S. Pat. No. 3,943,982) are similar to each other but have a different use than the plugs of the present invention. Duncan and LeCordier's plugs are pulled through the pipe with a cable and activate (plug and seal) only if a defect or leak is found. Both use friction to hold the plugs in place rather than mechanical interference as do the plugs of the present invention. Neither Duncan nor LeCordier's plugs seem to have the geometry necessary to go through pipe elbows. Herring (U.S. Pat. No. 3,746,026) is closest to the plugs of the present invention; however, the use of the Herring plug is different. The Herring plug moves through the pipe, then stops and seals on command, whereas the plugs of the present invention are initially sealed before lowering to the sea floor. Once released, the plugs of the present invention do not stop to plug the pipe again. Herring's plug also uses batteries to power an electrical release control mechanism. Herring also uses friction to grip the pipe wall rather than mechanical interferences.

Burleson (U.S. Pat. No. 3,577,737), Streigh (U.S. Pat. Nos. 4,184,515 and 4,178,967) and Mayfield (U.S. Pat. No. 4,142,371) all show plugs for straight pipe or platform pipes which are pulled out with cable rather than being pumped out. Teague (U.S. Pat. No. 3,537,483) shows a plug for pipe but it too is pulled out with a cable. Britton (U.S. Pat. No. 4,145,158), Coone (U.S. Pat. No. 4,175,592), Knox (U.S. Pat. No. 4,178,112), Bowerman (U.S. Pat. No. 3,533,241) and Mayfield (U.S. Pat. No. 4,024,723) all show various platform leg closures and pipe seals which are not applicable. Arnold (U.S. Pat. No. 3,842,612), Scodino (U.S. Pat. No. 3,978,892), Weaver (U.S. Pat. No. 3,669,153), Lien (U.S. Pat. No. 4,023,699), Flimon (U.S. Pat. No. 4,185,665) and Johnson (U.S. Pat. No. 3,166,124) all show cap type plugs which cannot pass through the pipe. Southgate (U.S. Pat. No. 4,011,620) and Deaver (U.S. Pat. No. 3,942,560) show designs which are not primarily plugs at all.

DESCRIPTION OF PREFERRED EMBODIMENTS

The type of deep subsea pipeline connection operation to be made determines the kind of plug which may be used. Subsea pipeline connection operations which are pertinent to the use of internal plugs can be divided into two cases, the first being on-bottom pipe pull-in operation (initiation or termination). These operations consist of (a) attaching a pull cable between the ends of two pipes previously placed on-bottom, (b) pulling them into alignment and together with an on-bottom cable puller, and (c) connecting and testing the completed joint. In this first case, it is assumed that one end of the pipe to be joined can be pulled across the bottom (as in the bottom tow method) either because the pipe string is short enough or because slack has been generated in one end of the line (for instance by developing a 90° bend during the pipelay operation). This connection method is suitable for either pipe-to-pipe connections or pipe-to-subsea structure connections. The pipe can be placed on bottom by any known pipelay method (e.g., bottom tow, conventional, or J-lay) and the connection can be a "first end" (initiation) or "second end" (termination) of the pipeline.

The second case, to which the present invention is particularly suited, involves pipe hinge-down operations (initiation only). This entails (a) lowering a pipeline end from a surface vessel, (b) engaging eccentric hinge halves by vertical stab-in procedures, and (c) adding pipe from the surface, laying the pipe string over, converting to a J-lay method, but at the same time engaging the connector ends by way of the hinge-over action. If it is not possible to vertically stab the pipe either because there is an interfering surface obstruction or because initiation is desired as part of a conventional pipelay operation (as opposed to J-pipe-laying), a cable can be established and the pipe end can be pulled in laterally as a part of the lowering-down procedure, creating a catenary like a small scope mooring line configuration. These hinge-down methods are preferably used in initiating a pipeline at an on-bottom structure, but can also be used to lay-away from an existing pipeline end.

FIG. 1 shows how internal plug 10 can be used in laying pipeline 11 from lay-vessel 12, which pipeline is initiated via mechanical connector 13 from riser 14 held in position on sea floor 15 by block 16. It is preferable to lay pipeline 11 filled with air in order to ease pipe handling problems and to reduce the likelihood of buckles in area 17 where the pipeline first touches bottom behind lay-vessel 12. Since riser 14 is fluid filled in order to hydrostatically test mechanical connector 13, preferably before proceeding with pipelaying, it is necessary to seal the rest of line 11 from liquid intrusion. This is done with plug 10. After the pipe laying operation is completed, plug 10 is released (by pressure equalization in the line as described hereinafter) and may travel out of the pipeline either via riser 14 or via pipeline 11, though preferably via riser 14 which is the shorter distance and more free of debris than pipeline 11.

Although such a plug is typically used at the submerged end 18 of pipeline 11 to keep the entire line light, there are applications where it is advantageous to place the plug at a point away from the pipe end. A plug spaced away from the pipe end allows that portion of pipe to be flooded without flooding the entire string. By flooding only a section of the pipe, the pipe's own weight is used to anchor that section to the seafloor while allowing the rest of the pipe to remain light and relatively easy to move. This technique is particularly useful in pipe terminations at a riser or other structure.

Internal plugs are most desirable from a convenience-of-construction point of view. Such plugs may be placed within the connector bore or in a special spool piece welded into the pipe string. There are no external projections to interfere with a lay-barge tensioner (not shown) or stinger (not shown). Such plugs can be recovered and reused to lower construction costs. Since internal plugs allow the connector to be joined prior to flooding, the new pipe may be flooded with clean water through the existing pipe rather than silt-laden water from the sea floor. Once construction is complete, the plug is completely removed from the line leaving behind no hindrance to operations.

Operational requirements for such plugs include the following: (1) plugs must seal against hydrostatic pressure. Pressure inside the pipe will generally be one atmosphere while pressure outside the pipe in, for example, 2000 feet of water will be sixty-one atmospheres or about 904 psi. Also, (2) plugs must resist axial loads due to hydrostatic pressure. The 889 psi pressure differential across the plug will produce an axial force of 350,000 pounds in a 22.4-inch inside diameter pipe. In addition, (3) plugs must withstand the stresses and strains imposed by the pipelaying process, and be removable without divers when the pipe is in its final position. Finally, (4) plugs must leave no obstruction in the pipe which could prevent passage of pigs or spheres in operation. The present invention meets each of these requirements.

Preferred features for plugs include the following: (1) plugs should allow easy pressure testing before installation, and allow the connector to be pressure tested in place. The latter implies that the plug should withstand pressures much higher than hydrostatic. For example, test pressure for a 24-inch connector is on the order of 3200 psi. Also, (2) plugs should be reusable with minor refurbishing. This is primarily important where many bottom-towed strings are being assembled together in a long line. Finally, (3) plugs should be lightweight and be low cost. The plug of the present invention has all of these preferred features.

Three basic elements are provided by the plug of this invention: a seal, a grip, and a release mechanism. Seals prevent water from entering the pipe. Elastomeric seals can be used since the seals are temporary and are not exposed to hydrocarbons. Grips hold the plug in place against the tremendous axial loads generated by the pressure differential across the plug. They transfer this load from the plug to the pipe. Because of the magnitude of the loads in deep water, the grips rely on mechanical interference rather than unpredictable adhesion or friction for load transfer. In the internal plug of this invention the grip may be teeth which engage a machined groove in the pipe wall.

The fact that the internal plug of this invention also is capable of being pumped through the pipe (as well as a riser) places constraints on its design and the design of the pipeline. Most of these constraints are to ensure that the geometry of the pipe and the plug cannot interact to form a mechanical interference. It is imperative that the plug not get stuck in the pipe. In essence, the plug has a geometry similar to a pipeline pig once it has been released from the pipe wall. The main obstacles it must overcome in its journey down the pipe are pipe deformations, such as ovality and dents, bends, and construction debris.

The geometry of the plug of this invention allows for a pipe inside diameter constriction on the order of about 4% of the nominal pipe diameter to account for manufacturing tolerances of outside diameter, wall thickness, and ovality, and other deformations such as dents incurred during laying. For example, a plug for 24-inch pipe with 0.8-inch wall thickness should have no metal or other rigid material within one inch of the nominal pipe wall. Of course, the exact tolerance required depends on the pipe being used. Each pipe joint should be checked with a caliper disk before installation to ensure sufficient clearance for the plug to pass if it is decided to pump the plug through the pipeline rather than the riser or other structure.

Figure 2:
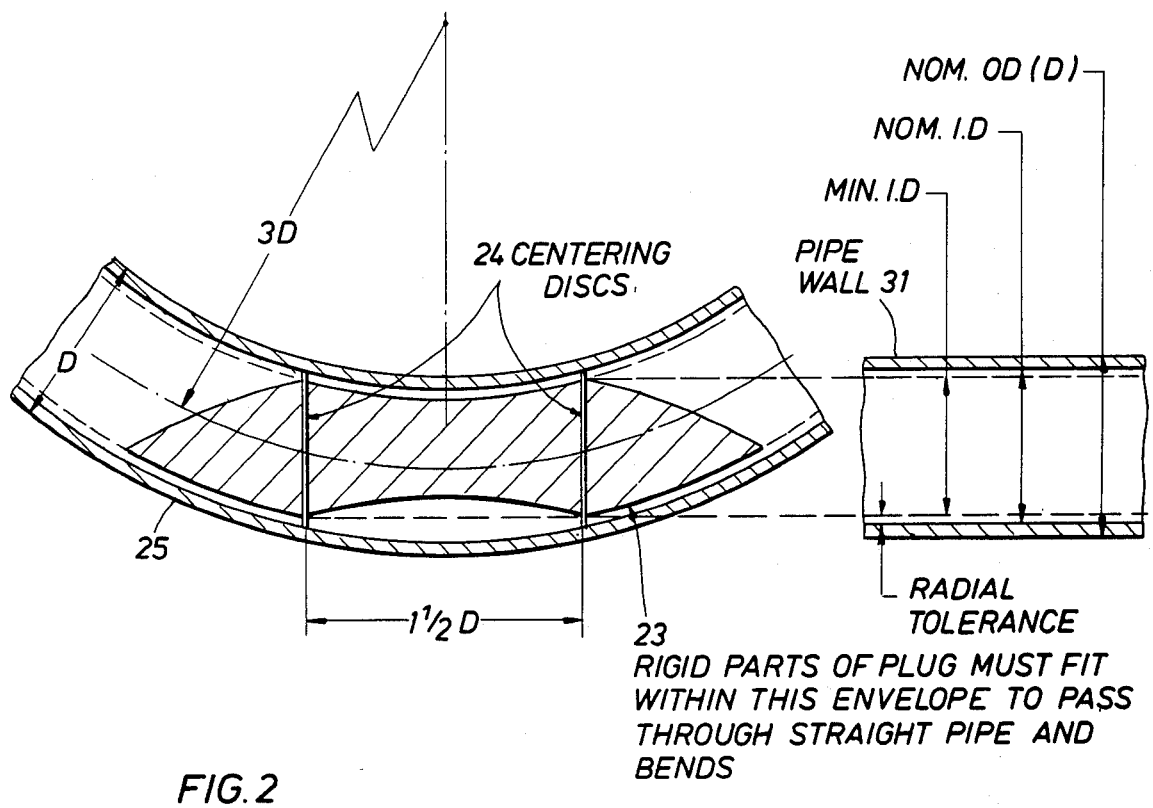
FIG. 2 depicts the geometric envelope for the plug.

Pipe bends place an additional geometrical constraint on the internal plug of this invention. FIG. 2 shows the envelope 23 in which the plug must fit to traverse a bend. Manufacturing tolerances must be accounted for as shown. The plugs have a length of about 1½ times the nominal outside diameter between flexible centering disks 24. This requires that the pipeline 25 have no bends sharper than about 3R (bend radius R=3×nominal pipe diameter).

Figure 3C:
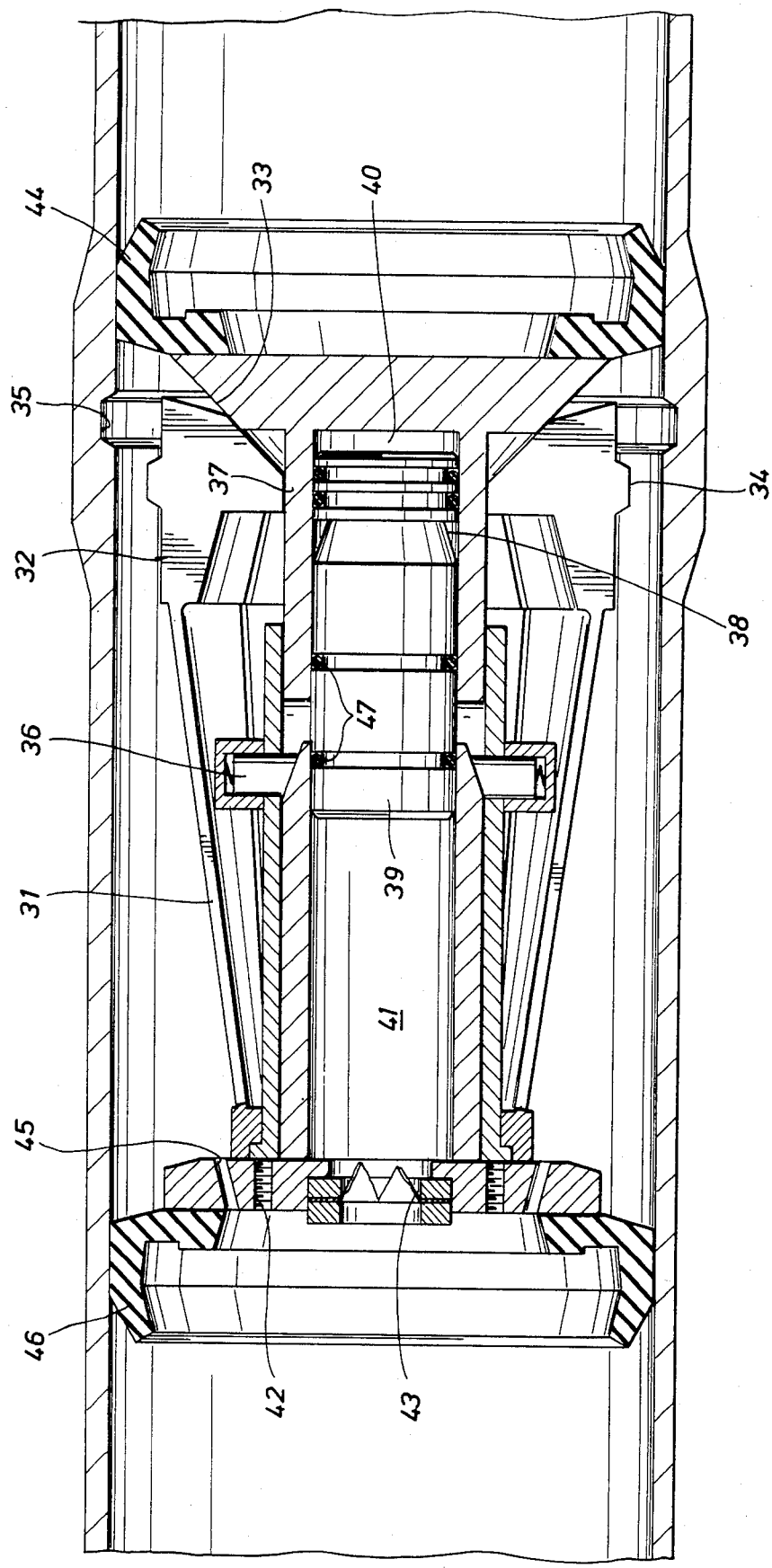
Figure 4:
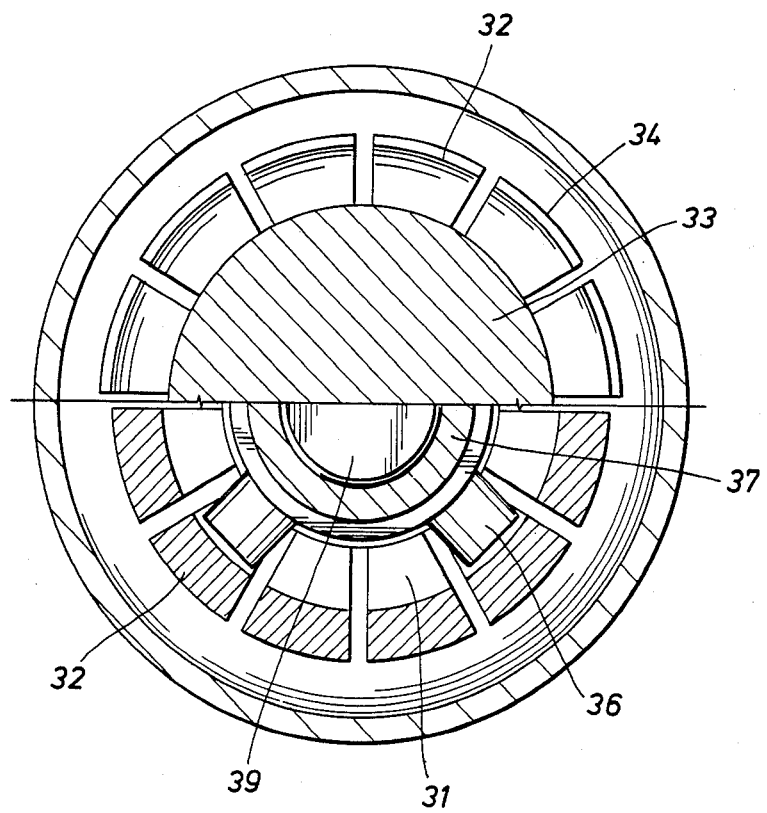
FIG. 4 is a cross sectional view of the invention as shown in FIG. 3(A).

The features of the internal plug are shown in FIGS. 3(A), 3(B) and 3(C). In FIG. 3(A) the plug is being locked into the pipe wall in the plug configuration. In FIG. 3(B) the plug is locked into the pipe wall. In FIG. 3(C) the plug is released from the pipe wall and ready to travel out of the pipeline.

The plug is locked into the pipe wall in FIG. 3(B) by means of grip setting screws 30. As these screws are inserted, colleted spring fingers 31 are pushed forward and grip 32 slides along wedge 33 until hub 34 enters locking groove 35 in the pipe wall, which may be reinforced with extra wall thickness in this location. In addition, spring loaded locking pins 36 slide into mating orifices in cylinder 37 and engage a locking groove 38 in pin release piston 39 which is now centrally located inside cylinder 37 with air chambers 40 and 41 on opposite sides thereof. Seals 47 aid in separating chambers 40 and 41.

After the plug is locked into the pipe wall, grip setting screws 30 are removed leaving open threaded holes 42, as shown in FIG. 3(C). Now that the plug is locked into place, pipeline 11 can be layed and joined via connector 13 to riser 14. Where the pipeline is being layed in deep water, which is the principal objective of this invention, connector 13 preferably is of a mechanical type permitting remote, diverless connection. However, such connectors preferably are hydrostatically tested prior to continuing with the laying of pipeline 11.

Such testing is now feasible without flooding pipeline 11 due to plug 10.

With high pressure on the right side of the plug, as shown in FIG. 3(B), cup seal 44 prevents leakage past the plug to the low pressure side and also forces wedge 33 against grip 32 to even more tightly secure the plug in the pipe line. The colleted grip 32 effectively provides a mechanical interference between the plug and pipe to transfer hydrostatic loads to the pipe. Thus, grip 32 provides a direct load path from wedge 33 and seal 44 to the pipe wall. The spring fingers 31 carry no load in the plugging configuration of FIG. 3(B). Seal 44 is flexible enough to accommodate irregularities in the pipe wall when the plug is pumped out and preferably is constructed of an elastomeric material.

In FIG. 3(C) the plug is released from the pipe wall. This is effected by pressuring pipeline 11 (e.g., filling with water) and breaking rupture disk 43. (Other suitable pressure release means include a relief valve or propagating buckle tube.) This permits passing the plug out of the line via riser 14 or other structure. When rupture disk 43 is broken the left side of the plug, as shown in FIG. 3(C), then becomes the higher pressure side and the right side of the plug becomes the lower pressure side, which facilitates moving the plug from left to right as shown. As fluid passes through ruptured disk 43, pin release piston 39 is forced to the right, which releases spring loaded locking pin 36 from locking groove 38. Simultaneously, fluid passes through flow ports 45 and threaded holes 42 and impinges against seal 44 as grip 32 and fingers 31 retract toward cylinder 37. Then the plug begins to move down the pipeline and out the riser, the trailing part of the plug being kept centered by elastomeric seal 46.

Thus, the release mechanism is entirely mechanical. Reliable actuation is accomplished by a mechanical spring rather than by hydraulic or pneumatic devices with their attendant seals. The mechanism consists of three concentric cylinders which slide within one another. No rotational motions or complicated linkages are used. The relative simplicity of the sliding cylinder mechanism enhances the reliability of the plug.

What is claimed is:

1. A method for laying a pipeline in an at least near neutral buoyancy condition comprising sealing a gas into at least part of a pipe string between a pipelay vessel at one end of the pipe string and a pressure releasable plug within the pipe string, connecting the pipe string to another pipe end, flooding the pipe string and releasing the plug with fluid pressure, and passing the plug out of the pipe string with the fluid pressure.

2. The method of claim 1 wherein the plug grips the wall of the pipe string until a predetermined pressure is achieved on the plug following flooding of the pipe string.

* * * * *